(12) United States Patent
Ito et al.

(10) Patent No.: US 9,026,380 B2
(45) Date of Patent: May 5, 2015

(54) AIR GAP MEASURING APPARATUS

(75) Inventors: Kenichi Ito, Tokyo (JP); Yasuaki Hashimoto, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 541 days.

(21) Appl. No.: 13/528,449

(22) Filed: Jun. 20, 2012

(65) Prior Publication Data
US 2012/0259558 A1  Oct. 11, 2012

Related U.S. Application Data

(63) Continuation-in-part of application No. PCT/JP2009/007056, filed on Dec. 21, 2009.

(51) Int. Cl.
*G01B 5/14*   (2006.01)
*G01B 7/14*   (2006.01)

(52) U.S. Cl.
CPC ... *G01B 5/14* (2013.01); *G01B 7/14* (2013.01)

(58) Field of Classification Search
CPC ........................................................ G01B 5/14
USPC ........................................................... 702/42
See application file for complete search history.

(56) References Cited

U.S. PATENT DOCUMENTS

| | | | |
|---|---|---|---|
| 4,235,019 A | 11/1980 | Cho | |
| 8,552,613 B2 * | 10/2013 | Stiesdal | 310/216.113 |
| 2001/0034948 A1 | 11/2001 | Matsumiya et al. | |
| 2005/0135927 A1 * | 6/2005 | Iwashige et al. | 415/175 |

FOREIGN PATENT DOCUMENTS

| JP | 53-37546 | 4/1978 |
|---|---|---|
| JP | 53-88755 | 8/1978 |
| JP | 61-80303 | 5/1986 |
| JP | 62-93713 | 6/1987 |

(Continued)

OTHER PUBLICATIONS

International Search Report from the Japanese Patent Office for International Application No. PCT/JP2009/007056, mailing date Mar. 16, 2010.

(Continued)

*Primary Examiner* — Bryan Bui
(74) *Attorney, Agent, or Firm* — Finnegan, Henderson, Farabow, Garrett & Dunner, L.L.P.

(57) ABSTRACT

Disclosed is an air gap measuring apparatus, for measuring width of an air gap formed between a rotator and a stator. An insertion section has a first flat plate section and a second flat plate section. Gap adjusting means drives the second flat plate section such that the second flat plate section moves away from the first flat plate section, until the first flat plate section and the second flat plate section abuts on the rotator and the stator. An operating section extends to outside of the insertion section, and operates the gap adjusting means. An elastic body has an end that follows the first flat plate section, and other end that follows the second flat plate section. A strain gage outputs electrical signals corresponding to the strain of the elastic body, the strain being formed due to the movement of the second flat plate section.

8 Claims, 6 Drawing Sheets

(56) References Cited

FOREIGN PATENT DOCUMENTS

| | | |
|---|---|---|
| JP | 3-8707 | 1/1991 |
| JP | 06-343250 | 12/1994 |
| JP | 10-322947 | 12/1998 |
| JP | 2001-246288 | 9/2001 |
| JP | 2002-022433 | 1/2002 |

OTHER PUBLICATIONS

International Preliminary Report on Patentability and Written Opinion issued by The International Bureau of WIPO on Jul. 19, 2012, for International Patent Application No. PCT/JP2009/007056.

* cited by examiner

PRIOR ART

AIR GAP MEASURING APPARATUS

CROSS REFERENCES TO RELATED APPLICATIONS

This application is a continuation-in-part (CIP) application based upon the International Application PCT/JP2009/007056, the International Filing Date of which is Dec. 21, 2009, the entire content of which is incorporated herein by reference.

FIELD

The present invention relates to an air gap measuring apparatus which is used to measure the width of a gap formed between a rotator and a stator in a rotating electrical machine.

BACKGROUND

A typical rotating electrical machine (for example, a synchronous electric motor) will be described below with reference to FIG. 6. The rotating electrical machine has a rotator 80 that is supported rotatable about an axis inside a housing 92; and a stator 86 that fixedly set up an outer periphery of the rotator 80 forming a gap (an air gap) 2 therebetween. The synchronous electric motor is disclosed in Jpn. Pat. Appln. Laid-Open Publication No. Hei 6-343250, the entire content of which is incorporated herein by reference, for example.

The rotator (for example, a salient pole type rotator) 80 has: a main shaft 82 that coaxially extends with an axis of a rotation, and supported rotatable about an axis by sliding bearings 94; and magnetic poles 84 that are attached to the outer periphery of abbreviated an intermediate part of the main shaft 82. Each of the magnetic poles 84 has: a pole body 84a that is attached to the outer periphery of the main shaft 82; a pole head 84b that is fixed to an outer periphery of the pole body 84a; and a rotator coil 84c that is wound around the pole body 84a. The saliency type rotator is disclosed in Jpn. Pat. Appln. Laid-Open Publication No. Hei 10-322947, the entire content of which is incorporated herein by reference, for example.

On the other hand, the stator 86 has: a stator core 88 that is fixedly set up at the outer periphery of the magnetic poles 84 (more specifically, the outer periphery of the pole heads 84b); and a stator coil 90 that is wound around the stator core 88.

Here, the width of the air gap 2 formed between the rotator 80 and the stator 86 has influence on operating characteristics of the rotating electrical machine. Therefore, when the rotating electrical machine has been assembled or maintained, there was a need to set the width of the air gap 2 at a predetermined value by measuring the width of the air gap 2 with a taper gage (by an air gap measurement).

In the air gap measurement, an operator inserts the taper gage into the housing 92 from an opening and closing section 96 formed at an axial end of the housing 92. Then, the taper gage is inserted into the housing 92 along the main shaft 82 in the direction of the arrow 100 shown in FIG. 6. The taper gage is then inserted into the axial end of the air gap 2.

However, it is hard for the operator to measure, because the distance from the opening/closing section to the air gap 2 is long. For this reason, an experienced operator is required for the measurement of high precision. And it takes a long time to measure. In addition, because the operator puts one's hand into the housing 92 from the opening/closing section 96 and measures, it is not safe.

SUMMARY OF THE INVENTION

The present invention has been made to solve the above problem, and an object thereof is to provide an air gap measuring apparatus capable of measuring the width of the gap formed between the rotator and the stator in the rotating electrical machine easily.

In order to achieve the object, there is provided an air gap measuring apparatus for measuring width of an air gap formed between a rotator rotatably supported about an axis and a stator fixedly set up at an outer periphery of the rotator in a rotating electrical machine, the apparatus comprising: an insertion section that has a first flat plate section, and a second flat plate section which is disposed parallel to the first flat plate section with a space and which is movable toward and away from the first flat plate section, the insertion section being configured to be inserted into the air gap; gap adjusting means that is disposed inside the insertion section, and drives the second flat plate section such that the second flat plate section moves away from the first flat plate section, until an outer surface of the first flat plate section and an outer surface of the second flat plate section abuts on the outer periphery of the rotator and an inner periphery of the stator; an operating section that is attached to the gap adjusting means, extends to outside of the insertion section, and operates the gap adjusting means; an elastic body that has an end that follows the first flat plate section, and other end that follows the second flat plate section such that strain is formed due to movement of the second flat plate section away from the first flat plate section; a strain gage that is adhered on a surface of the elastic body, and outputs electrical signals corresponding to the strain of the elastic body, the strain being formed due to movement of the second flat plate section away from the first flat plate section; and calculating means that is connected to the strain gage, and calculates distance between the first flat plate section and the second flat plate section based on the electrical signals from the strain gage.

BRIEF DESCRIPTION OF THE DRAWINGS

The above and other features and advantages of the present invention will become apparent from the discussion herein below of specific, illustrative embodiments thereof presented in conjunction with the accompanying drawings, in which.

DETAILED DESCRIPTION

First Embodiment

An air gap measuring apparatus according to a first embodiment of the present invention will be described.

Figure 1:
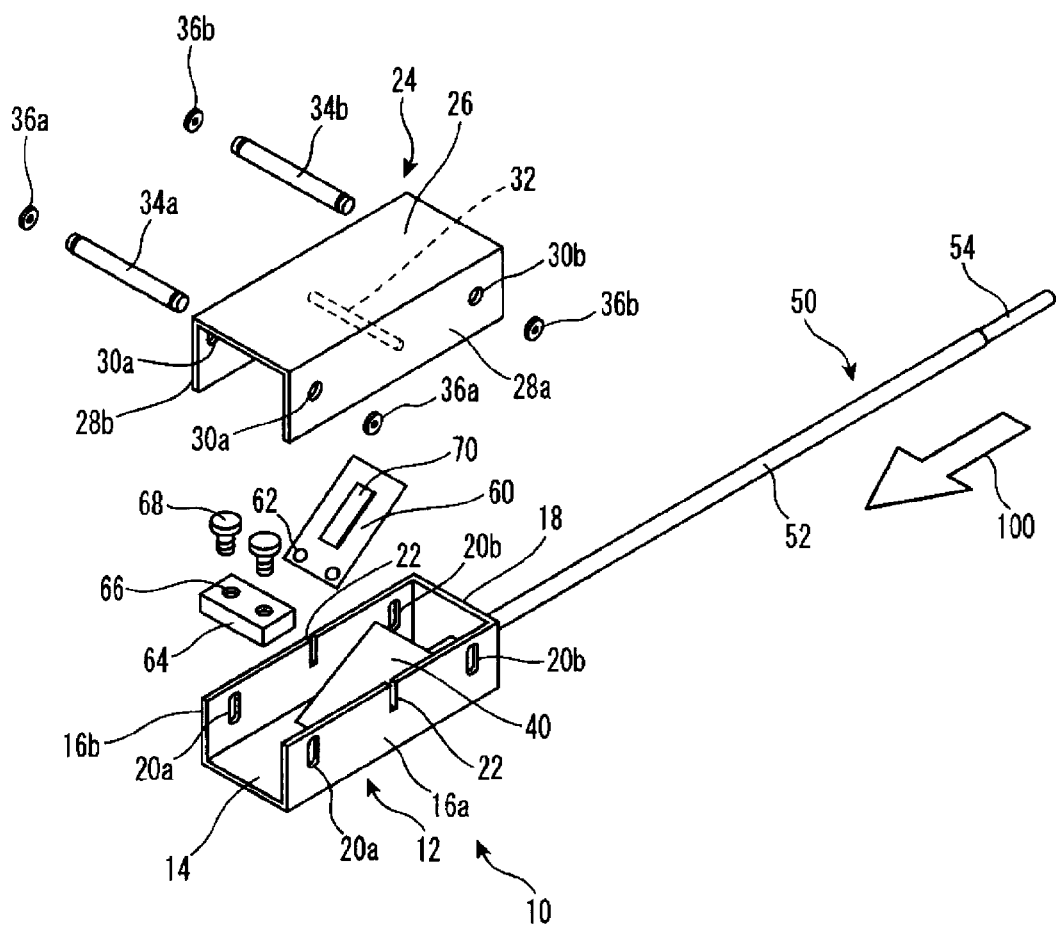
FIG. 1 is an exploded perspective view illustrating an air gap measuring apparatus according to a first embodiment of the present invention, wherein a calculating means and the like are omitted to be shown.
Figure 2:
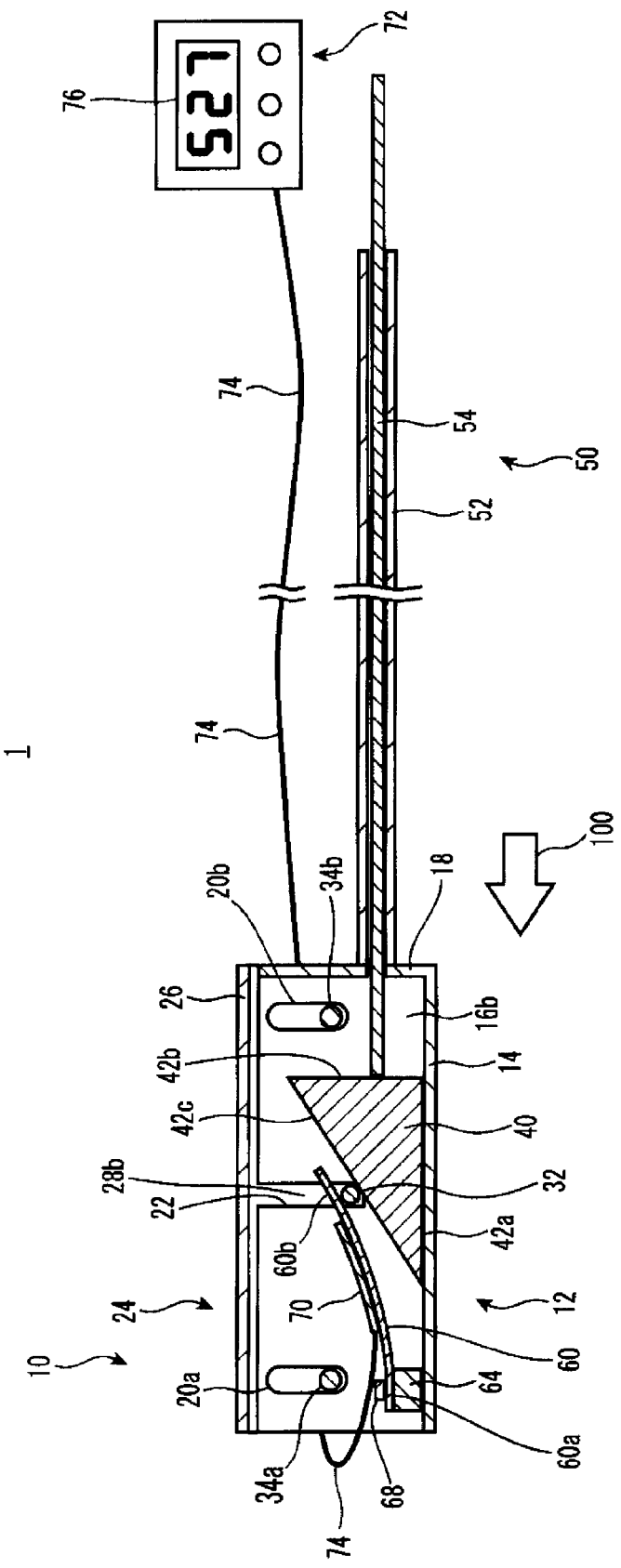
FIG. 2 is a partial and longitudinal cross-sectional view of the air gap measuring apparatus before the measurement, according to the first embodiment of the present invention.
Figure 3:
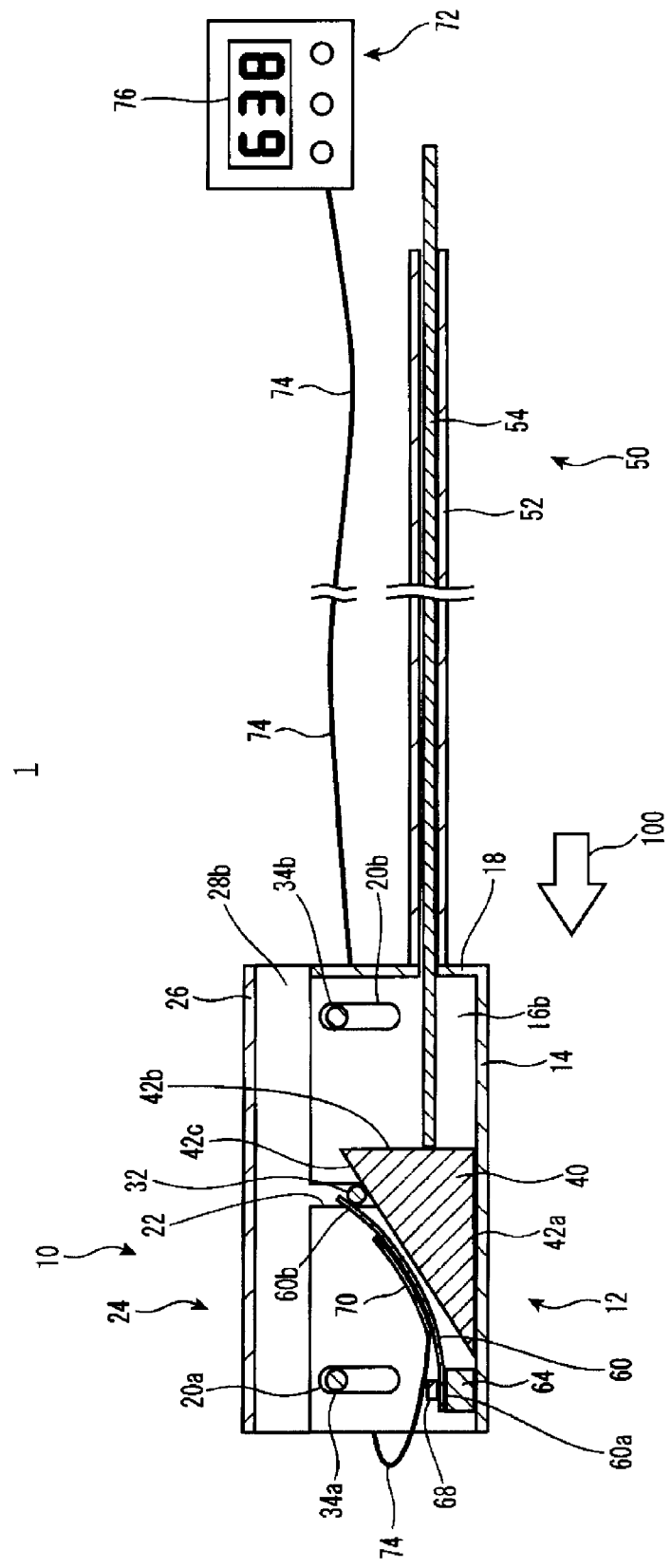
FIG. 3 is a partial and longitudinal cross-sectional view of the air gap measuring apparatus during the measurement, according to the first embodiment of the present invention.

At first, an air gap measuring apparatus according to the first embodiment will be described below with reference to FIG. 1 to FIG. 3. FIG. 1 is an exploded perspective view illustrating an air gap measuring apparatus according to the first embodiment of the present invention, wherein a calculating means and the like are omitted to be shown. FIG. 2 is a partial and longitudinal cross-sectional view of the air gap measuring apparatus before the measurement, according to the first embodiment of the present invention. FIG. 3 is a partial and longitudinal cross-sectional view of the air gap measuring apparatus during the measurement, according to the first embodiment of the present invention.

The air gap measuring apparatus 1 is an apparatus for measuring the width of the gap (the air gap) 2 formed between the rotator 80 supported rotatable about an axis and the stator 86 fixedly set up around outside of the rotator 80. The air gap measuring apparatus 1 has an insertion section 10, a gap adjusting means (a wedge shape member) 40, an operating section 50, an elastic body (a leaf spring) 60, a strain gage 70, a calculating means 72 and an output means 76.

Figure 6:
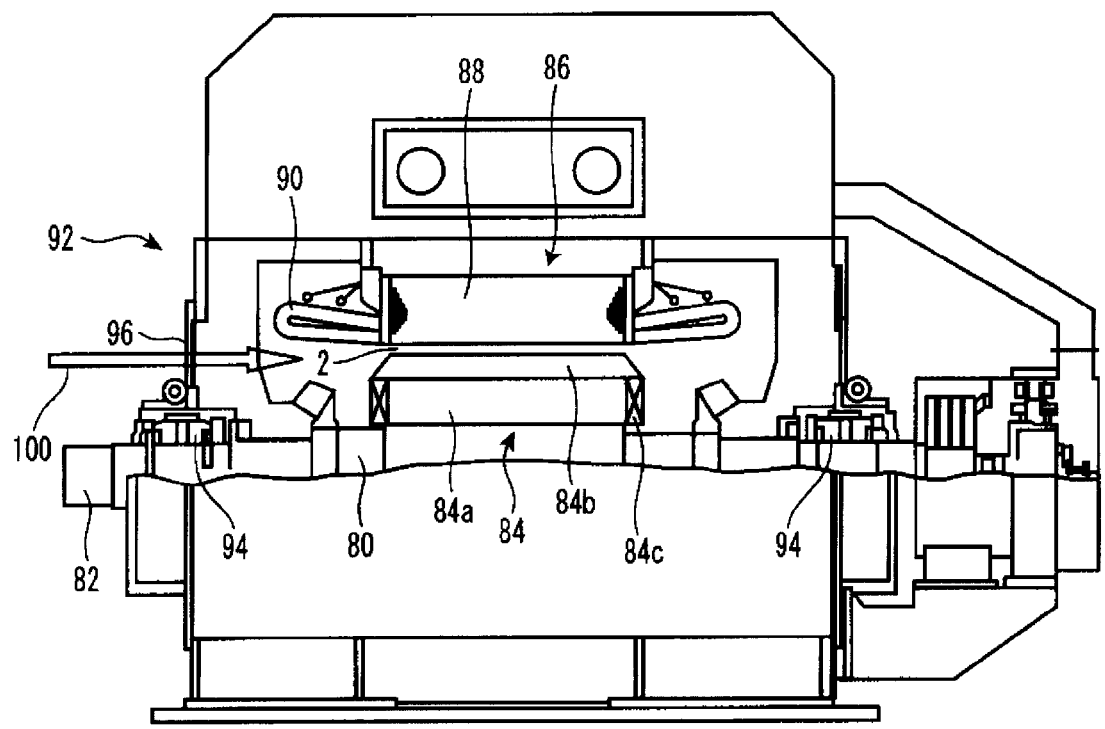
FIG. 6 is a partial and vertical cross-sectional view illustrating a rotating electrical machine.

The insertion section 10 is inserted into the air gap 2 (See FIG. 6). The insertion section 10 has a first case 12 and a second case 24, and is formed in a rectangular parallelepiped as a whole.

The first case 12 has: a first flat plate section 14 that forms a bottom surface; two first side plate sections 16a, 16b that form side surfaces and face with each other; and a first end plate section 18 that forms an end surface (an end surface at the near end opposite to the insertion direction 100). The second case 24 has: a second flat plate section 26 that forms an upper surface; and two second side plate sections 28a, 28b that form side surfaces and face to each other.

The second case 24 is disposed on the first case 12 such that the second case 24 covers the first case 12. In the case, an inner surface of the second flat plate section 26 faces to an inner surface of the first flat plate section 14. The second flat plate section 26 is disposed parallel to the first flat plate section 14 with a space. And an inner surface of the second side plate sections 28a, 28b faces to an outer surface of the first side plate sections 16a, 16b with a narrowest gap therebetween.

The second side plate sections 28a, 28b each has two pin holes 30a, 30b. The two pin holes 30a are arranged face to face each other, and the two pin holes 30b are arranged face to face each other. The first side plate sections 16a, 16b each has two elongated holes 20a, 20b at locations corresponding to the pin holes 30a, 30b. The elongated holes 20a, 20b extend perpendicular to the first flat plate section 14. The elongated holes 20a, 20b are formed such that width of the elongated holes 20a, 20b are almost the same as diameter of the pin holes 30a, 30b. Furthermore, guide pins 34a, 34b are inserted into the two pin holes 30a, 30b and the two elongate holes 20a, 20b, respectively. The guide pins 34a, 34b are fixed to the second case 24 by pin holders 36a, 36b.

The guide pins 34a, 34b are guided by the elongate holes 20a, 20b, respectively. Therefore, the second case 24 is movable toward and away from the first case 12. That is to say, the second flat plate section 26 maintains parallel state to the first flat plate section 14, and is movable toward and away from the first flat plate section 14.

Furthermore, the second case 24 has an abutting bar 32. The abutting bar 32 is disposed perpendicular to the inner surface of the second side plate sections 28a, 28b such that the abutting bar 32 is disposed between the second side plate section 28a and the second side plate section 28b. An end of the abutting bar 32 is fixed to the inner surface of the second side plate section 28a, and other end of the abutting bar 32 is fixed to the inner surface of the second side plate section 28b. A pair of notches 22 is formed in the first side plate sections 16a, 16b. The notches 22 extend perpendicular to the first flat plate section 14, to locations corresponding to the abutting bar 32. The width of the notches 22 are slightly larger than the diameter of the abutting bar 32. The abutting bar 32 is inserted into the notches 22, and is guided by the notches 22.

The gap adjusting means is disposed inside the insertion section 10. The gap adjusting means moves the second case 24 away from the first case 12, until an outer surface of the first flat plate section 14 and an outer surface of the second flat plate section 26 abut on an outer periphery of the rotator 80 and an inner periphery the stator 86.

In the first embodiment, the gap adjusting means is a wedge shape member 40. The wedge shape member 40 is disposed on an inner surface of the first flat plate section 14 such that the wedge shape member 40 can slide in the insertion direction 100 and in a direction opposite to the insertion direction 100 on the inner surface of the first flat plate section 14. As shown in FIG. 2 and FIG. 3, the wedge shape member 40 is formed so that a cross-section shape in the insertion direction 100 is a right triangle. A surface (a sliding surface) 42a corresponding to a bottom of the right triangle is in contact with the inner surface of the first flat plate section 14. A surface (a sit up surface) 42b perpendicular to the sliding surface 42a is fixed to an end of a pusher rod 54 described below. And a surface (a slope surface) 42c corresponding to a hypotenuse of the right triangle is inclined the second flat plate section 26 in the direction opposite to the insertion direction 100.

When the wedge shape member 40 slides in the insertion direction 100, the slope surface 42c of the wedge shape member 40 abuts on the abutting bar 32 (See FIG. 2). When the wedge shape member 40 slides more in the insertion direction 100, the slope surface 42c of the wedge shape member 40 pushes the second flat plate section 26 to the direction away from the first flat plate section 14 (See FIG. 3). That is to say, the slope surface 42c pushes the second case 24 to the direction away from the first case 12.

The operating section 50 is a section that is used to operate the gap adjusting means (the wedge shape member 40), and has a holding pole 52 and a pusher rod 54. The holding pole 52 is formed in a tube and is fixed to the first case 12. An end of the holding pole 52 is fixed to an outer surface of the first end plate section 18. The holding pole 52 extends in the direction away from the insertion section 10 (in the direction opposite to the insertion direction 100). A through-hole is formed at the portion of the first end plate section 18 where the holding pole 52 is fixed. Inside of the holding pole 52 is connected to inside of the insertion section 10.

The pusher rod 54 is disposed inside of the holding pole 52 such that the pusher rod 54 can slide in the insertion direction 100 and in the direction opposite to the insertion direction 100. An end of the pusher rod 54 protrudes into inside of the insertion section 10 from an end of the holding pole 52 in the insertion direction 100, and is fixed to the sit up surface 42b of the wedge shape member 40. Other end of the pusher rod 54 protrudes from an end of the holding pole 52 in the direction opposite to the insertion direction 100. When the pusher rod 54 slides in the insertion direction 100 and in the direction opposite to the insertion direction 100 with respect to the holding pole 52, the wedge shape member slides in the insertion direction 100 and in the direction opposite to the insertion direction 100 accordingly.

The elastic body 60 is a rectangular leaf spring 60, and is disposed in the insertion section 10. At an end in the insertion direction 100 of the inner surface of the first flat plate section 14, a fixing board 64 is fixed in which screw holes 66 are formed. At an end (an end in the insertion direction 100) 60a of a longer direction of the leaf spring 60, through-holes 62 with female screws are formed. The end 60a of the elastic body 60 is fixed on the fixing board 64 by screws 68, and follows the movement of the first flat plate section 14. The region near other end (other end in the direction opposite to the insertion direction 100) 60b of a longitudinal direction of the leaf spring 60 on the surface facing to the first flat plate section 14 of the elastic body 60 abuts on an outer periphery of an abutting pin 32, and follows the movement of the second flat plate section 26.

In a state that the second case 24 is at a closest position to the first case 12 (for example, in the state shown FIG. 2), the leaf spring 60 is slightly a curved shape along in the insertion direction 100 to the first flat plate section 14. On the other hand, in a state that the second case 24 moves away from the first case 12 (when the second case 24 moves toward the state shown FIG. 3 from the state shown FIG. 2) by pushing the pusher rod 54 in the insertion direction 100, other end 60b of the leaf spring 60 follows the movement of the second flat plate section 26, and moves away from the first flat plate section 14. At that time, the leaf spring 60 is strained along the insertion direction 100, and this strain scale is large compared with the state that the second case 24 is at the closest position to the first case 12.

The strain gage 70 is adhered on a surface of the leaf spring 60 along the insertion direction 100, and outputs electrical signals corresponding to the strain of the leaf spring 60.

The calculating means 72 is connected to the strain gage 70 through a cable 74, and calculates the distance (that is to say, the width of the air gap 2) between the outer surface of the first flat plate section 14 and the outer surface of the second flat plate section 26 based on the electrical signals from the strain gage 70.

To be more specifically, the calculating means 72 has a calculating unit and a memory unit. The relation of the distance between the outer surface of the first flat plate section 14 and the outer surface of the second flat plate section 26 and the strain of the leaf spring 60 (that is to say, the strain of the strain gage 70) is previously stored in the memory unit. The calculating unit inputs the electrical signals from the strain gage 70, retrieves the information indicating the distance between the outer surface of the first flat plate section 14 and the outer surface of the second flat plate section 26 corresponding to the electrical signals from the memory unit.

The output means 76 is a display unit capable of displaying seven-segment, for example. The output means 76 is connected to the calculating means 72, and digitally displays the distance between the outer surface of the first flat plate section 14 and the outer surface of the second flat plate section 26. The output means 76 may be a printer, for example, that prints out the distance between the outer surface of the first flat plate section 14 and the outer surface of the second flat plate section 26.

An air gap measuring method using the air gap measuring apparatus 1 according to the first embodiment will be described below with reference to FIG. 2, FIG. 3 and FIG. 6.

At first, the operator pulls the pusher rod 54 in the direction opposite to the insertion direction 100 to the holding pole 52, and moves the wedge shape member 40 in the direction opposite to the insertion direction 100. At this time, the air gap measuring apparatus 1 is in the state shown FIG. 2 where the second case 24 is at the closest position to the first case 12. That is to say, the distance between the outer surface of the first flat plate section 14 and the outer surface of the second flat plate section 26 is shortest.

Then, the operator opens the opening and closing section 96 which is formed at an end of the housing 92 of the rotating electrical machine in the axis of the rotation, and inserts the insertion section 10 into the housing 92 along the main shaft 82 of the rotator 80. Furthermore, the operator inserts the insertion section 10 into the air gap 2 to the direction of the axis of the rotation. At this time, for example, the outer surface of the first flat plate section 14 faces to the outer periphery of the rotator 80, and the outer surface of the second flat plate section 26 faces to an inner periphery of the stator 86.

Afterwards, the operator pushes the pusher rod 54 in the insertion direction 100 to the holding pole 52, and drives the wedge shape member 40 in the insertion direction 100. Then, the second case 24 receives the force from the slope surface 42c of the wedge shape member 40 through the abutting bar 32, and moves away from the first case 12.

The operator pushes the pusher rod 54 in the insertion direction 100 to the holding pole 52, until the outer surface of the first flat plate section 14 abuts on the outer periphery of the rotator 80, and the outer surface of the second flat plate section 26 abuts on the inner periphery of the stator 86 (the state shown in FIG. 3). At this time, the strain gage 70 outputs electrical signals corresponding to the strain. The strain is obtained by the strain gage 70 that receives the force from the abutting bar 32 through the elastic body 60. The electrical signals from the strain gage 70 are input to the calculating means 72, and are translated into the information indicating the distance (that is to say, the width of the air gap 2) between the outer surface of the first flat plate section 14 and the outer surface of the second flat plate section 26. Then, the display unit 76 digitally displays the information indicating the distance (the width of the air gap 2) translated by the calculating means 72.

The advantage of the air gap measuring apparatus 1 according to the first embodiment will be described below with reference to FIG. 1, and FIG. 2.

The operator can measure the width of the air gap 2 by pushing the pusher rod 54 in the insertion direction 100 relative to the holding pole 52. Thus, the measurement can be easily done with high precision in a short time by an inexperienced operator.

In addition, since the pusher rod 54 and the holding pole 52 extends away from the insertion section 10, the operator does not have to put his hand into the housing 92 of the rotating electrical machine. Therefore, it is safe.

The operator can measure only the width of the air gap 2 formed between an end of the rotator 80 and an end of the stator 86 using a conventional taper gage. On the other hand, by using the air gap measuring apparatus 1 according to the first embodiment, the operator can insert the insertion section 10 into the air gap 2, and can push the insertion section 10 inside the air gap 2 along the direction of the axis of the rotation. For this reason, the operator can measure also the width of the air gap 2 formed between an intermediate part of the rotator 80 and an intermediate part of the stator 86.

Second Embodiment

Figure 4:
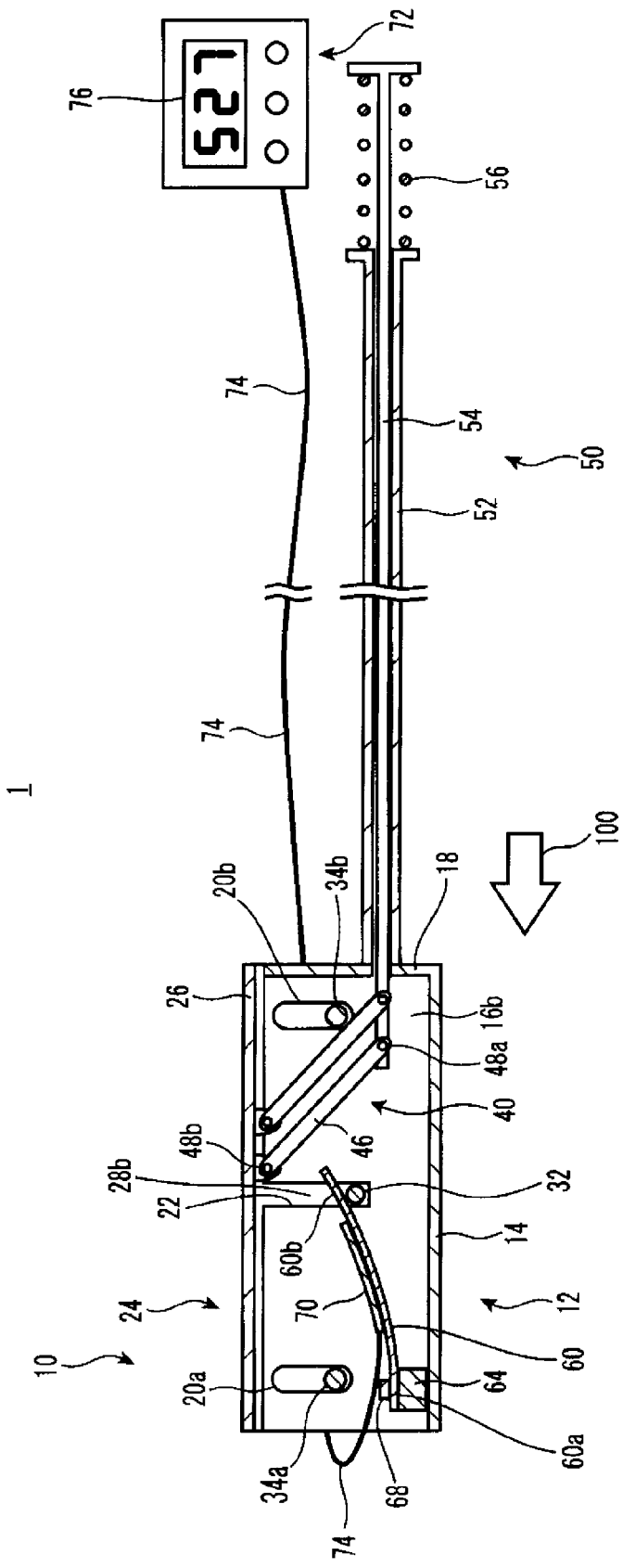
FIG. 4 is a partial and longitudinal cross-sectional view of an air gap measuring apparatus before the measurement, according to a second embodiment of the present invention.
Figure 5:
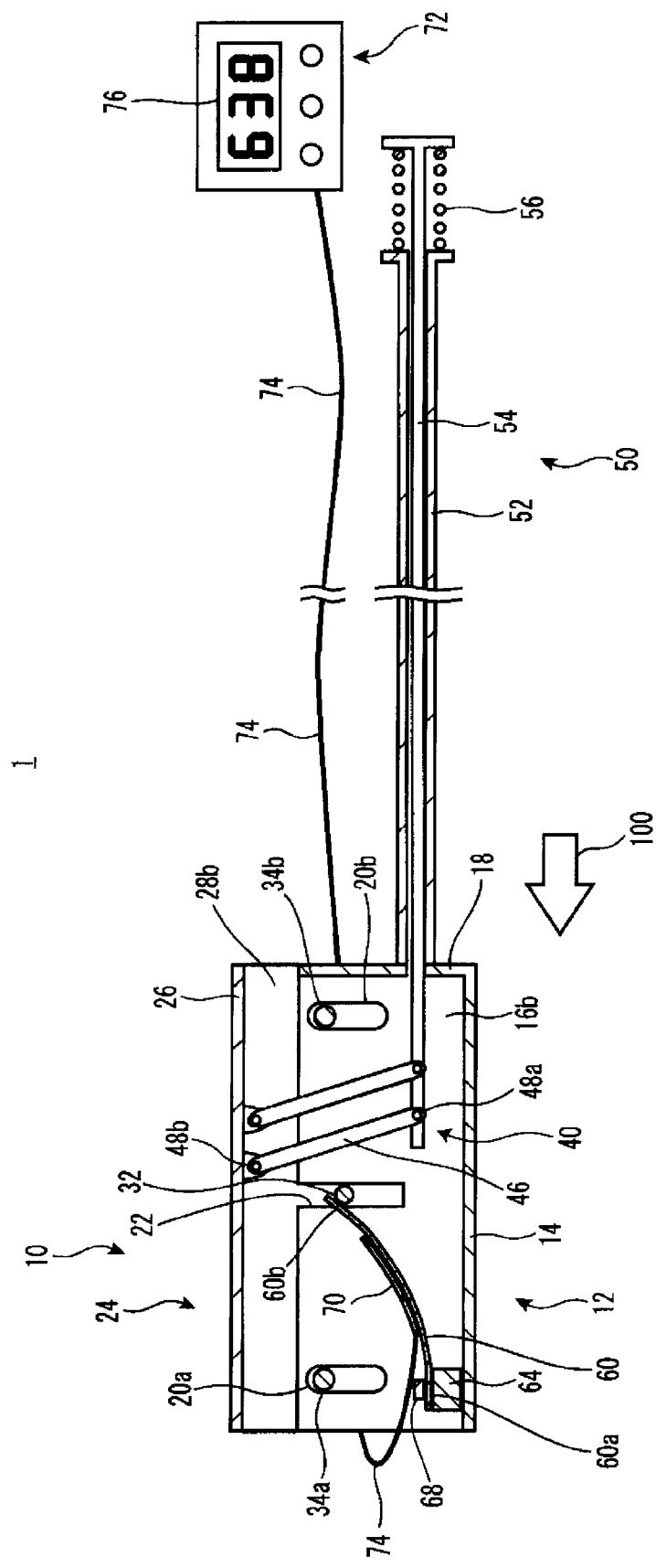
FIG. 5 is a partial and longitudinal cross-sectional view of the air gap measuring apparatus during the measurement, according to the second embodiment of the present invention.

The air gap measuring apparatus according to a second embodiment will be described below with reference to FIG. 4 and FIG. 5. FIG. 4 is a partial and longitudinal cross-sectional view of an air gap measuring apparatus before the measurement, according to the second embodiment of the present invention. FIG. 5 is a partial and longitudinal cross-sectional view of the air gap measuring apparatus during the measurement, according to the second embodiment of the present invention. The second embodiment is a modified example of the first embodiment. Same reference numerals are assigned to same or similar parts, and redundant explanation is omitted.

In the second embodiment, the gap adjusting means is a link mechanism 44. The link mechanism 44 has two turning bars 46. An end of the turning bars 46 each is attached to an end of the pusher rod 54 such that the turning bars 46 can turns by turning pins 48a with respect to the end of the pusher rod 54 in the insertion direction 100. On the other hand, the other ends of the turning bars 46 are attached to the second flat plate section 26 such that the turning bars 46 can turn by turning pins 48b with respect to the second flat plate section 26.

Before the measurement, the turning bars 46 are disposed on the pusher rod 54 and the second flat plate section 26 such that the turning bars 46 are inclined with respect to the pusher rod 54 and the second flat plate section 26 (See FIG. 4). During the measurement, when the pusher rod 54 slides in the insertion direction 100, the turning bars 46 is rise with respect to the pusher rod 54 and the second flat plate section 26 (See FIG. 5). As a result, the second case 24 and the abutting bar 32 moves away from the first case 12, and the leaf spring 60 and the strain gage 70 are strained.

And, in the second embodiment, flange sections 52f, 54f are disposed on the other end of the holding pole 52 and the other end of the pusher rod 54 in the direction opposite to the insertion direction 100, respectively. A compressed coil spring (a biasing means) 56 is disposed between the flange section 52f of the holding pole 52 and the flange section 54f of the pusher rod 54. The pusher rod 54 is biased by the coil spring 56 in the direction opposite to the insertion direction 100 with respect to the holding pole 52.

As a result, the air gap measuring apparatus 1 is automatically set back to an initial state in the time of nonuse on when the pusher rod 54 is not pushed by the operator. Thus, it is easy to use Other Embodiment Embodiments described above are just exemplifications, and the present invention is not limited to the exemplifications. For example, the coil spring (the biasing means) 56 in the air gap measuring apparatus according to the second embodiment can be applied to the first embodiment.

While certain embodiments have been described, these embodiments have been presented by way of example only, and are not intended to limit the scope of the inventions. Indeed, the novel embodiments described in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

What is claimed is:

1. An air gap measuring apparatus for measuring width of an air gap formed between a rotator rotatably supported about an axis and a stator fixedly set up at an outer periphery of the rotator in a rotating electrical machine, the apparatus comprising:
an insertion section that has a first flat plate section, and a second flat plate section which is disposed parallel to the first flat plate section with a space and which is movable toward and away from the first flat plate section, the insertion section being configured to be inserted into the air gap;
gap adjusting means that is disposed inside the insertion section, and drives the second flat plate section such that the second flat plate section moves away from the first flat plate section, until an outer surface of the first flat plate section and an outer surface of the second flat plate section abuts on the outer periphery of the rotator and an inner periphery of the stator;
an operating section that is attached to the gap adjusting means, extends to outside of the insertion section, and operates the gap adjusting means;
an elastic body that has an end that follows the first flat plate section, and other end that follows the second flat plate section, such that strain is formed due to movement of the second flat plate section away from the first flat plate section;
a strain gage that is adhered on a surface of the elastic body, and outputs electrical signals corresponding to the strain of the elastic body, the strain being formed due to movement of the second flat plate section away from the first flat plate section; and
calculating means that is connected to the strain gage, and calculates distance between the first flat plate section and the second flat plate section based on the electrical signals from the strain gage.

2. The air gap measuring apparatus according to claim 1, wherein
an end of the elastic body is fixed to the first flat plate section so as to follows the first flat plate section, and other end of the elastic body abuts on an abutting bar which is fixed to the second flat plate section so as to follows the second flat plate section.

3. The air gap measuring apparatus according to claim 1, wherein
the operating section has:
a tubular holding pole that is fixed to the first flat plate section, and extends outside of the insertion section; and
a pusher rod that is disposed penetrating the holding pole such that the pusher rod can slide in an insertion direction or in a direction opposite to the insertion direction with respect to the holding pole, an end of the pusher rod being attached to the gap adjusting means.

4. The air gap measuring apparatus according to claim 1, wherein
the gap adjusting means is a wedge shape member which is disposed on an inner surface of the first flat plate section such that the wedge shape member slides on the inner surface of the first flat plate section, and when the wedge shape member slides in the insertion direction, a slope surface of the wedge shape member abuts on an abutting bar, and the second flat plate section moves away from the first flat plate section.

5. The air gap measuring apparatus according to claim 3, wherein
the gap adjusting means is a link mechanism which has a turning bar, an end of the turning bar being rotatably attached to a front end of the pusher rod in the insertion direction, another and of the turning bars being rotatably attached to the second flat plate section, the link mechanism being so configured that that the turning bars rises when the pusher rod slides in the insertion direction, and the second flat plate section moves away from the first flat plate section.

6. The air gap measuring apparatus according to claims 3, wherein
the operating section farther has:
biasing means that biases the pusher rod in the direction opposite to the insertion direction with respect to the holding pole.

7. The air gap measuring apparatus according to claim 1, wherein
the insertion section has:
a first case that includes the first flat plate section as a bottom surface thereof;
a second case that includes the second flat plate section as an upper surface thereof; and
guide pins that engage the second case with the first case such that the second case is movable toward and away from the first case.

8. The air gap measuring apparatus according to claim 1, farther comprising:
a display unit that displays the distance between the first flat plate section and the second flat plate section calculated by the calculating means.

\* \* \* \* \*